Aug. 4, 1936.  C. CACIOPPO  2,050,158
MILK TREATING APPARATUS
Filed April 29, 1936
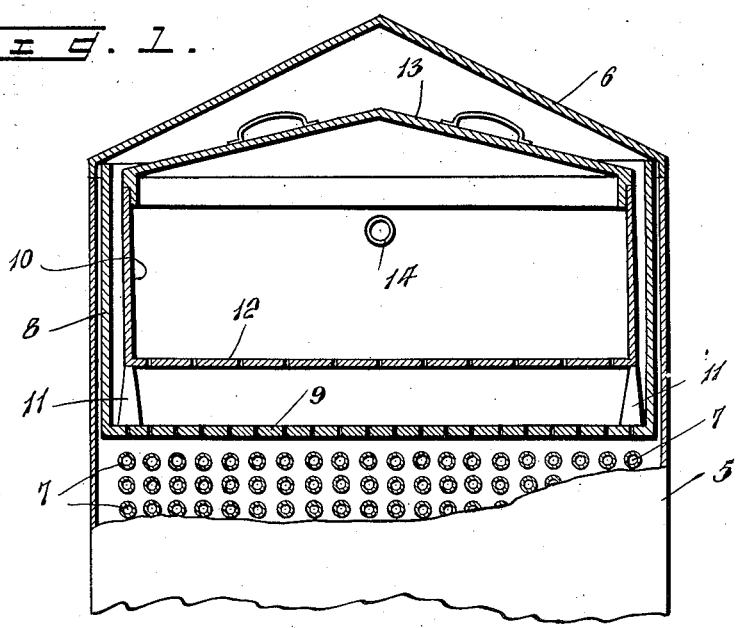
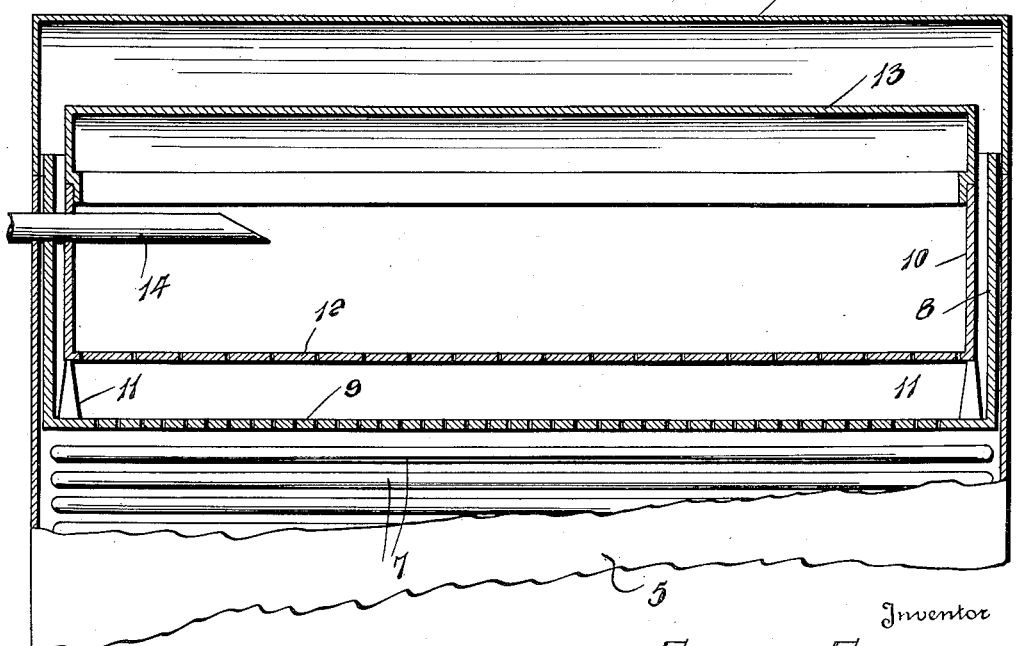
Inventor
CHARLES CACIOPPO
By F. K. Bryant
Attorney Patented Aug. 4, 1936

2,050,158

UNITED STATES PATENT OFFICE 2,050,158

MILK TREATING APPARATUS

Charles Cacioppo, Forest Hills, N. Y.

Application April 29, 1936, Serial No. 77,028

1 Claim. (Cl. 257—189)

This invention relates to certain new and useful improvements in milk treating apparatus.

In the treatment of milk and similar liquids for pasteurizing or cooling purposes, it is the usual practice to supply the milk under pressure to a perforated pipe located within a container having a perforated bottom wall disposed above heating or cooling coils in a receptacle and in the use of such apparatus the milk issues in jets from the perforated pipes for discharge through the perforated bottom wall with the jets arranged in spaced relation so that the milk is caused to flow over the heating or cooling coils in substantially spaced zones with considerable areas of the coils remaining ineffective for the treatment of the milk. It is therefore the primary object of the invention to cause the milk to substantially come to rest before passage through the perforated bottom wall of the container so that the milk is evenly discharged through the perforated bottom wall and evenly distributed over the coils.

A further object of the invention is to provide milk treating apparatus of the foregoing character having an auxiliary receptacle with the perforated bottom wall for the reception of milk through a pipe introduced through an end wall with the milk evenly discharged through the perforated bottom wall of the auxiliary container and into a surrounding container having a perforated bottom wall disposed above the heating or cooling coils for the even distribution of milk over the coils.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a fragmentary end elevational view, partly broken away and shown in section of milk treating apparatus constructed in accordance with the present invention and illustrating the main and auxiliary containers within an outer receptacle that contains the heating or cooling coils; and Figure 2 is a fragmentary side elevational view, partly broken away and shown in section.

Referring more in detail to the accompanying drawing, there is illustrated milk treating apparatus comprising an outer receptacle 5 having a removable cover wall 6 with a bank or heating or cooling coils 7 within the receptacle 5 and spaced from the upper end thereof as illustrated in Figure 1. A main container is removably mounted in the upper end of the receptacle 5 above the bank of coils 7 and is of the general shape of the receptacle, the main container 8 being open at its upper end and having a perforated bottom wall 9 disposed in proximity of the bank of coils 7.

An auxiliary container 10 is removably mounted in the main container 8 and is supported in spaced relation to the bottom wall of the main container by feet or blocks 11 and said auxiliary container 10 has a perforated bottom wall 12. A splash-tight cover 13 is removably mounted upon the open upper end of the auxiliary container 10. A liquid supply pipe, such as for milk is illustrated by the reference character 14 and passes through adjacent end walls of the outer receptacle 5 and the main and auxiliary containers 8 and 10.

Milk is introduced into the auxiliary container 10 through the supply pipe 14 and while the milk may be under pressure, the same substantially comes to rest within the auxiliary container 10 for an even distribution through the perforated bottom wall 12 into the main container 8 and from which the milk is more slowly and evenly distributed through the bottom to the perforated bottom wall 9 of the main container 8 over the entire surfaces of the heating or cooling coils 7. It will be understood that the volume of milk introduced to the auxiliary container 10 is such that a relatively high level is maintained in the auxiliary container to assure an even distribution or discharge of the milk from the auxiliary container 10 through the perforated bottom wall 12 thereof into the main container 8 and from which the same is similarly distributed by way of the perforated bottom wall 9 onto the bank of coils 7.

From the above detailed description of the invention, it is believed that the construction and operation thereof will at once be apparent and while there is herein shown and described the preferred embodiment of the invention it is nevertheless to be understood that minor changes may be made therein without departing from the spirit and scope of the invention as claimed.

What is claimed is:—

Milk treating apparatus comprising an outer receptacle, a bank of coils therein terminating in spaced relation to the upper end of the receptacle, a container in the upper end of the receptacle having a perforated bottom wall spaced from the bank of coils, means in the container to effect an even distribution of milk through the perforated bottom wall for an even distribution over the bank of coils, including an auxiliary container having a perforated bottom wall spaced from the bottom wall of the first named container, spacer blocks for supporting the auxiliary container in spaced relation to the first named container, and a splash proof cover for the auxiliary container.

CHARLES CACIOPPO.